US012726222B2

(12) United States Patent
Conway et al.

(10) Patent No.: US 12,726,222 B2
(45) Date of Patent: Sep. 1, 2026

(54) DIRECT-SAMPLED WIDE-BAND COMPRESSIVE RECEIVER

(71) Applicant: BAE Systems Information and Electronic Systems Integration Inc., Nashua, NH (US)

(72) Inventors: Nathaniel J. Conway, Nashua, NH (US); Christopher N. Peters, Nashua, NH (US)

(73) Assignee: BAE Systems Information and Electronic Systems Integration Inc., Nashua, NH (US)

(*) Notice: Subject to any disclaimer, the term of this patent is extended or adjusted under 35 U.S.C. 154(b) by 219 days.

(21) Appl. No.: 18/822,783

(22) Filed: Sep. 3, 2024

(65) Prior Publication Data

US 2026/0066933 A1 Mar. 5, 2026

(51) Int. Cl.
*H04B 1/18* (2006.01)
*H04B 1/16* (2006.01)

(52) U.S. Cl.
CPC ............ *H04B 1/18* (2013.01); *H04B 1/1607* (2013.01)

(58) Field of Classification Search
CPC ................................ H04B 1/18; H04B 1/1607
See application file for complete search history.

(56) References Cited

U.S. PATENT DOCUMENTS

2013/0230131 A1* 9/2013 Moore ..................... H04B 1/30 455/296
2018/0248575 A1* 8/2018 Bardin ..................... H04B 1/16

* cited by examiner

*Primary Examiner* — Brenda H Pham
(74) *Attorney, Agent, or Firm* — Scott J. Asmus

(57) ABSTRACT

Techniques for compressive receiving. An example RF receiver includes a plurality of digital phase shifters configured to apply a phase encoding scheme to a multi-band digital signal to produce a plurality of reference signals and a corresponding plurality of phase-encoded signals, each reference signal and each phase-encoded signal containing frequency information representing a respective sub-band of the multi-band digital signal, summers that respectively sum the plurality of reference signals and the plurality of phase-encoded signals, channelizers that divide the summed reference signal and the summed phase-encoded signal into a plurality of frequency bins, and a detector configured to detect a signal of interest and to perform delta phase measurements using the summed reference signal and the summed phase-encoded signal to estimate an original RF frequency of the detected signal of interest.

20 Claims, 6 Drawing Sheets

DIRECT-SAMPLED WIDE-BAND COMPRESSIVE RECEIVER

FIELD OF DISCLOSURE

The present disclosure relates to signal processing, and more particularly to techniques for detecting and analyzing radio frequency (RF) signals.

BACKGROUND

There are many applications that involve monitoring for radio frequency (RF) signals. For example, RF signal scanners, such as police scanners and electronic warfare systems, can be used to detect the presence of signals of interest across a portion of the electromagnetic spectrum. RF signal scanners may sweep across a broad range of frequencies to find the signals of interest before locking onto a signal of interest to observe it more closely and provide an appropriate response, if deemed necessary.

SUMMARY

Aspects and examples are directed to RF signal processing systems.

According to one example, an RF receiver system comprises a plurality of digital phase shifters configured to apply a phase encoding scheme to a multi-band digital signal to produce a plurality of reference signals and a corresponding plurality of phase-encoded signals, each reference signal and each phase-encoded signal containing frequency information representing a respective sub-band of the multi-band digital signal. The RF receiver system may further comprise a first summer configured to sum the plurality of reference signals to produce a summed reference signal, a second summer configured to sum the plurality of phase-encoded signals to produce a summed phase-encoded signal, a first channelizer coupled to the first summer to receive the summed reference signal and configured to divide the summed reference signal by frequency into a plurality of frequency bins to produce reference channel data, and a second channelizer coupled to the second summer to receive the summed phase-encoded signal and configured to divide the summed phase-encoded signal by frequency into the plurality of frequency bins to produce phase-encoded channel data. In some examples, the RF receiver system further comprises a detector coupled to at least one of the first and second channelizers and configured to perform delta phase measurements using the reference channel data and the phase-encoded channel data to identify at least one signal of interest, wherein to perform the delta phase measurements includes to compare a phase of one or more signals in the phase-encoded channel data with a phase of one or more corresponding signals in the reference channel data to estimate an original RF frequency of the at least one signal of interest.

Another example includes a computer program product including one or more non-transitory machine-readable mediums encoded with instructions that when executed by one or more processors cause a process to be carried out for determining a frequency of a radio frequency (RF) signal. In some examples, the process comprises receiving a set of N digital signals, N being an integer number, wherein each digital signal represents a respective frequency sub-band of a frequency bandwidth covered by the set of N digital signals in combination, applying a common phase offset to the set of N digital signals to produce N reference signals, and individually applying a different phase shift to each individual digital signal in the set of N digital signals to produce N phase-encoded signals, wherein individual phase-encoded signals are separated in phase from one another by a step value. The process may further comprise summing the N reference signals to produce a summed reference signal, summing the N phase-encoded signals to produce a summed phase-encoded signal, and dividing the summed reference signal and the summed phase-encoded signal into a plurality of frequency bins. The process may further comprise detecting, in a particular frequency bin from among the plurality of frequency bins, a pulse representing the RF signal, performing delta phase measurements between the summed reference signal and the summed phase-encoded signal in the particular frequency bin, and based on the delta phase measurements, determining the frequency of the RF signal.

According to another example, an RF receiver system comprises a plurality of digital phase shifters configured to produce a plurality of reference signals and a plurality of phase-encoded signals, wherein each digital phase shifter is configured to receive a respective digital input signal, to apply a phase offset to the respective digital input signal to produce a respective reference signal, and to apply a unique phase shift to the respective digital input signal to produce a respective phase-encoded signal; wherein the phase offset is common to all respective reference signals, and wherein the unique phase shift applied by each digital phase shifter to the respective phase-encoded signals is selected according to a phase encoding scheme. The RF receiver system may further comprise a first summer configured to combine the plurality of reference signals to produce a summed reference signal, a second summer configured to combine the plurality of phase-encoded signals to produce a summed phase-encoded signal, a channelizer sub-system configured to divide the summed reference signal and the summed phase-encoded signal into a plurality of frequency bins, and a detector configured to detect, in a particular frequency bin from among the plurality of frequency bins, a pulse representing an RF signal represented in one of the digital input signals and to perform delta phase measurements between the summed reference signal and the summed phase-encoded signal in the particular frequency bin to estimate a frequency of the RF signal.

Still other aspects, examples, and advantages of these exemplary aspects and examples are discussed in detail below. Examples disclosed herein may be combined with other examples in any manner consistent with at least one of the principles disclosed herein, and references to "an example," "some examples," "an alternate example," "various examples," "one example" or the like are not necessarily mutually exclusive and are intended to indicate that a particular feature, structure, or characteristic described may be included in at least one example. The appearances of such terms herein are not necessarily all referring to the same example.

DETAILED DESCRIPTION

Figure 1:
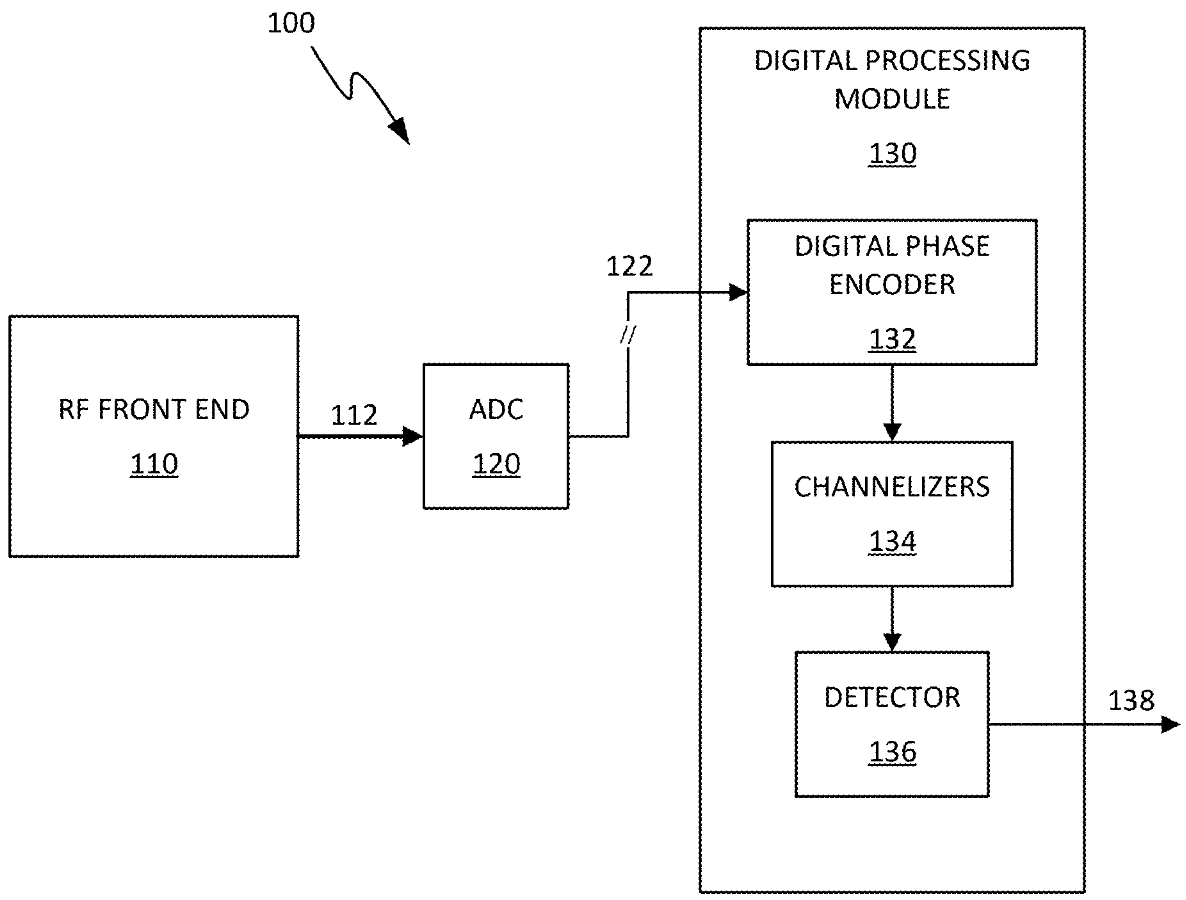
FIG. 1 is a block diagram of an RF digital receiver system in accord with aspects of the disclosed technology.

Techniques and structures are disclosed for providing an all-digital phase encoding scheme that can be used to accomplish compressive receiving. In an example, a radio frequency (RF) receiver system is configured to apply compressive receiving techniques in the digital domain and allows for a configurable instantaneous bandwidth to sampled bandwidth ratio, which in turn allows for direct leveraging of multiple digital channelizer streams. Furthermore, signal splitting, phase encoding, and signal re-combining can be performed in the digital domain with little to no frequency dips between sub-bands and with high phase accuracy. The digital phase encoding scheme and compressive receiving techniques described herein may be used in variety of RF signal monitoring systems and applications, and in conjunction with a variety of processing platforms.

In one such example, the RF receiver system comprises a plurality of digital phase shifters configured to apply a phase encoding scheme to a multi-band digital signal to produce a plurality of reference signals and a corresponding plurality of phase-encoded signals. Each reference signal and each phase-encoded signal may contain frequency information representing a respective sub-band of the multi-band digital signal. The RF receiver system may include a first summer configured to sum the plurality of reference signals to produce a summed reference signal, and a second summer configured to sum the plurality of phase-encoded signals to produce a summed phase-encoded signal. The summed signals can then be divided in frequency into a plurality of frequency bins. For example, the RF receiver system may include a first channelizer coupled to the first summer to receive the summed reference signal and configured to divide the summed reference signal by frequency into a plurality of frequency bins to produce reference channel data, and a second channelizer coupled to the second summer to receive the summed phase-encoded signal and configured to divide the summed phase-encoded signal by frequency into the plurality of frequency bins to produce phase-encoded channel data. In some such examples, the RF receiver system further includes a detector coupled to at least one of the first and second channelizers and configured to perform delta phase measurements using the reference channel data and the phase-encoded channel data to identify at least one signal of interest. To perform the delta phase measurements, the detector may compare a phase of one or more signals in the phase-encoded channel data with a phase of one or more corresponding (e.g., time coincident) signals in the reference channel data to estimate an original RF frequency of the at least one signal of interest based on a difference in phase between the two signals.

General Overview

RF receivers can be used in various applications to monitor a wide frequency band. In applications in which an RF receiver is used, for example, to scan for frequency hopping spread spectrum signals, fast, real-time detection with good frequency resolution can be desirable. Such and other RF receivers may use analog-to-digital converters (ADCs) with a high sample rate in order to cover a wide frequency range (e.g., several tens of Gigahertz (GHz)) in a short time. The faster the sample rate, the more data may be generated by the ADC. Accordingly, as ADC technology advances to offer higher sample rates, digital RF receivers may need to handle ever increasing data rates, and thus increasing data quantity, from very high sample rate ADCs. To process this data in real time may involve very high power consumption, which in turn may cause significant heating of circuitry/chip/chip-set. In some instances, the power consumption of circuitry attempting to handle such high data rates may rise past levels that can be effectively cooled, which may result in damage to the circuitry or an inability of the circuitry to process the quantity of data.

Accordingly, aspects and examples provide a direct sampled wide-band compressive receiver architecture and methodology that may address the issue of high power consumption that traditional signal processing chains suffer from when trying to process a wide bandwidth signal. As described further below, certain examples involve dividing a wide-band RF input signal into multiple sub-bands that can be processed in parallel. As a result, the amount of data handled by an individual processing stream is reduced, thereby reducing the power consumption (and cooling requirements) associated with the data processing.

Some architectures for wideband RF receivers have relied on analog encoding techniques combined with digital decoding to accomplish compressive receiving. However, analog encoding may suffer from several significant drawbacks, and can be difficult to implement. For example, physical losses and imperfections introduced by an analog encoding process may reduce sensitivity, reduce measurement accuracy, and increase DC power consumption. Furthermore, analog encoding approaches can be inflexible (e.g., once a particular analog encoding scheme is implemented in hardware, it is fixed), which may limit agile adaption to particular applications.

In contrast, an example system described herein may provide all-digital phase encoding and signal processing techniques for compressive receiving. An all-digital approach may offer advantages, such as improved accuracy, improved flexibility, and lower power consumption. For example, by implementing compressive receiving techniques in the digital domain, rather than analog domain, the firmware and/or software used for the implementation can be configurable in various aspects, allowing for a highly dynamic and flexible system. Furthermore, near perfect digital phase encoding may allow for improved decoding performance and accuracy for signals with low signal to noise ratio (SNR).

As described further below, according to certain examples, a single input data stream is divided, by frequency, into a plurality of individual sub-bands that are then digitally down-converted to baseband. Each down-converted sub-band is both phase-encoded ("tagged") with a unique phase shift to produce a tagged channel and optionally phase-encoded with a common phase offset to produce a reference channel. In some examples, the common phase offset is zero degrees (e.g., no phase offset is applied to in the reference channel). The tagged channel signals from the plurality of sub-bands are then summed and passed to a first digital channelizer. Similarly, the reference channel signals from the plurality of sub-bands are summed and passed to a second digital channelizer. In some examples, through implementation in the digital domain, the system can have a configurable instantaneous bandwidth to sampled bandwidth ratio and can thus be configured for various different channelizer implementations. Furthermore, signal splitting, phase encoding, and signal summing can be performed in the digital domain without significant frequency dips between sub-bands and with high phase accuracy. The data from the digital channelizers can then be processed by a signal detector configured for pulse detection to detect signals of interest. As described further below, in some examples, when a pulse is detected, the original frequency can be resolved by taking a delta phase measurement between the reference channel and the tagged channel. In some examples, signal detection can be accomplished with a single thread of pulse detection circuitry.

System Architecture

FIG. 1 is a block diagram of an example of an RF digital receiver system 100 for detecting and monitoring RF signals in accordance certain aspects. In this example, the system 100 includes an RF front end 110, at least one ADC 120, and a digital processing module 130.

The RF front end 110 receives RF signals and directs a wide-band (e.g., several tens of GHz in bandwidth) RF input signal 112 to the ADC 120. Accordingly, the RF front end 110 may include circuitry such as an antenna array, gain control circuitry, and/or filtering circuitry, for example, along with various other components and/or circuitry to receive and process the incoming wide-band RF input signal 112 before it is sent to the ADC 120 for digitization. Although a single ADS 120 is illustrated in FIG. 1, in some examples, the ADC 120 represents multiple ADCs, as described further below.

The ADC 120 samples the wide-band RF input signal 112 to convert it into a digital signal 122. In some examples, the ADC 120 has a high sample rate, for example, on the order of 20 gigasamples per second (Gsps). As noted above, in some examples, the ADC 120 includes one or more individual ADCs, as described further below. The digital signal 122 output from the ADC 120 is provided to the digital processing module 130.

Figure 6:
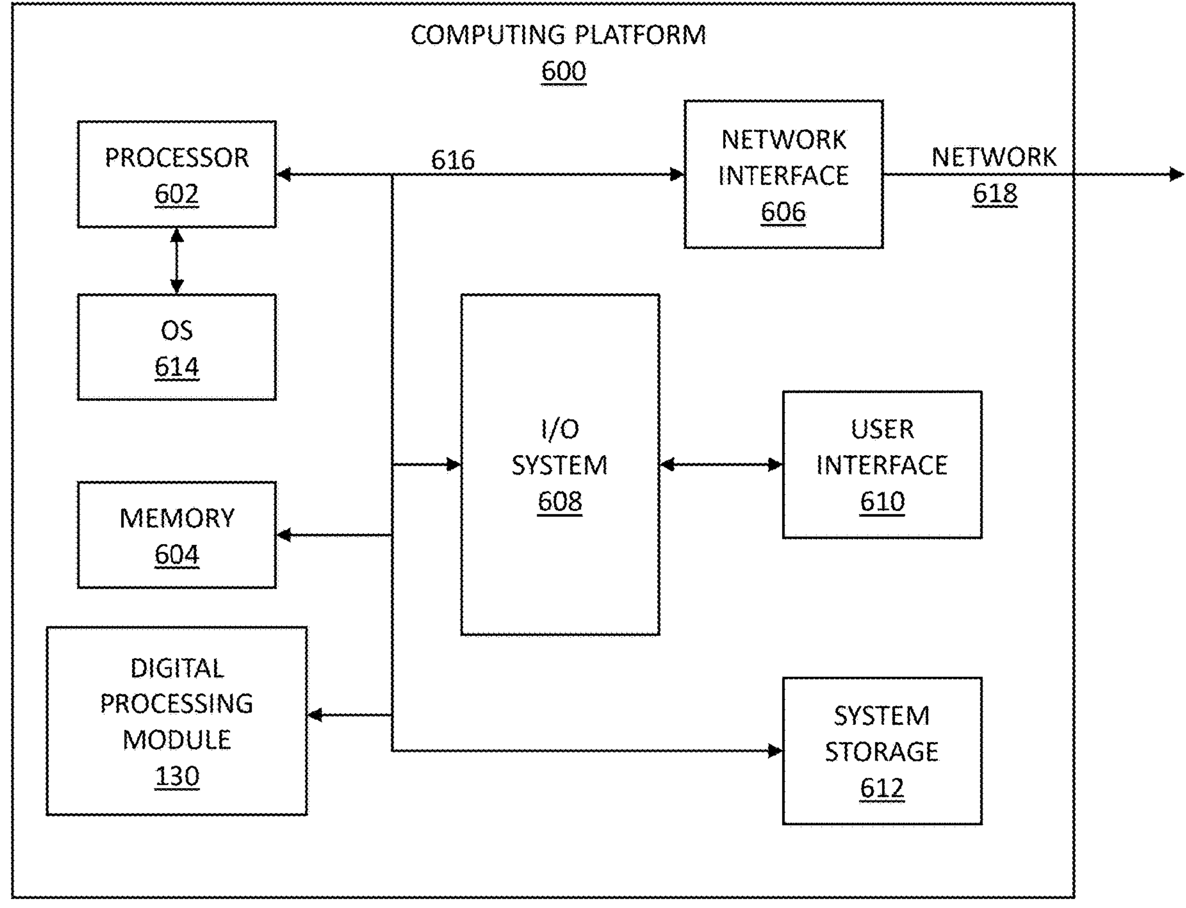
FIG. 6 is a block diagram of one example of a computing platform in accord with aspects of the disclosed technology.

In the illustrated example, the digital processing module 130 includes a digital phase encoder 132, a plurality of channelizers 134, and a detector 136. In some examples, the digital processing module 130 may be implemented, in whole or in part, in a field programmable gate array (FPGA). In other examples, the digital processing module 130, or some components thereof, may be implemented at least in part in software or instructions and one or more processors, as discussed below. An example of a computing platform 600 that can be used to implement some or all functionality associated with the digital processing module 130 is shown in FIG. 6 and described below, although other processing environments can be used.

According to certain examples, the digital signal 122 is divided into a plurality of frequency sub-bands that can be individually processed, optionally in parallel, by the digital phase encoder 132. In some examples in which the ADC 120 is a single ADC, the digital phase encoder 132 comprises a plurality of digital down-converters, each tuned to a different frequency sub-band, such that each sub-band can be uniquely encoded by the digital phase encoder 132. In other examples, the ADC 120 may comprise a plurality of ADCs that perform digital down-conversion to produce the plurality of frequency sub-bands. Examples of a digital phase encoding scheme that can be implemented by the digital phase encoder 132 are described in more detail below. Signals from the digital phase encoder 132 can be provided to the channelizers 134. In some examples, the digital phase encoder 132 produces a combined reference signal (representing information from all the sub-bands) that is provided to a first channelizer, and a combined phase-encoded signal (also referred to as a tagged signal and also representing information from all the sub-bands) that is provided to a second channelizer, as described below with reference to FIG. 2. The channelizers 134 separate or divide the reference signal and the phase-encoded signal into a plurality of individual frequency bins. These frequency bins can then be analyzed by the detector 136 to look for one or more signals of interest that may have been present in the wide-band RF input signal 112. In some examples, for some or all frequency bins, the detector 136 performs a phase comparison between the reference signals and the phase encoded signals to determine delta phase measurements. Based on the delta phase measurements, the detector 136 may determine the frequencies of one or more signal(s) of interest present in the wide-band RF input signal 112, as described further below. Thus, the detector 136 produces an output signal 138 that identifies (e.g., by frequency) any one or more detected signals of interest.

Figure 2:
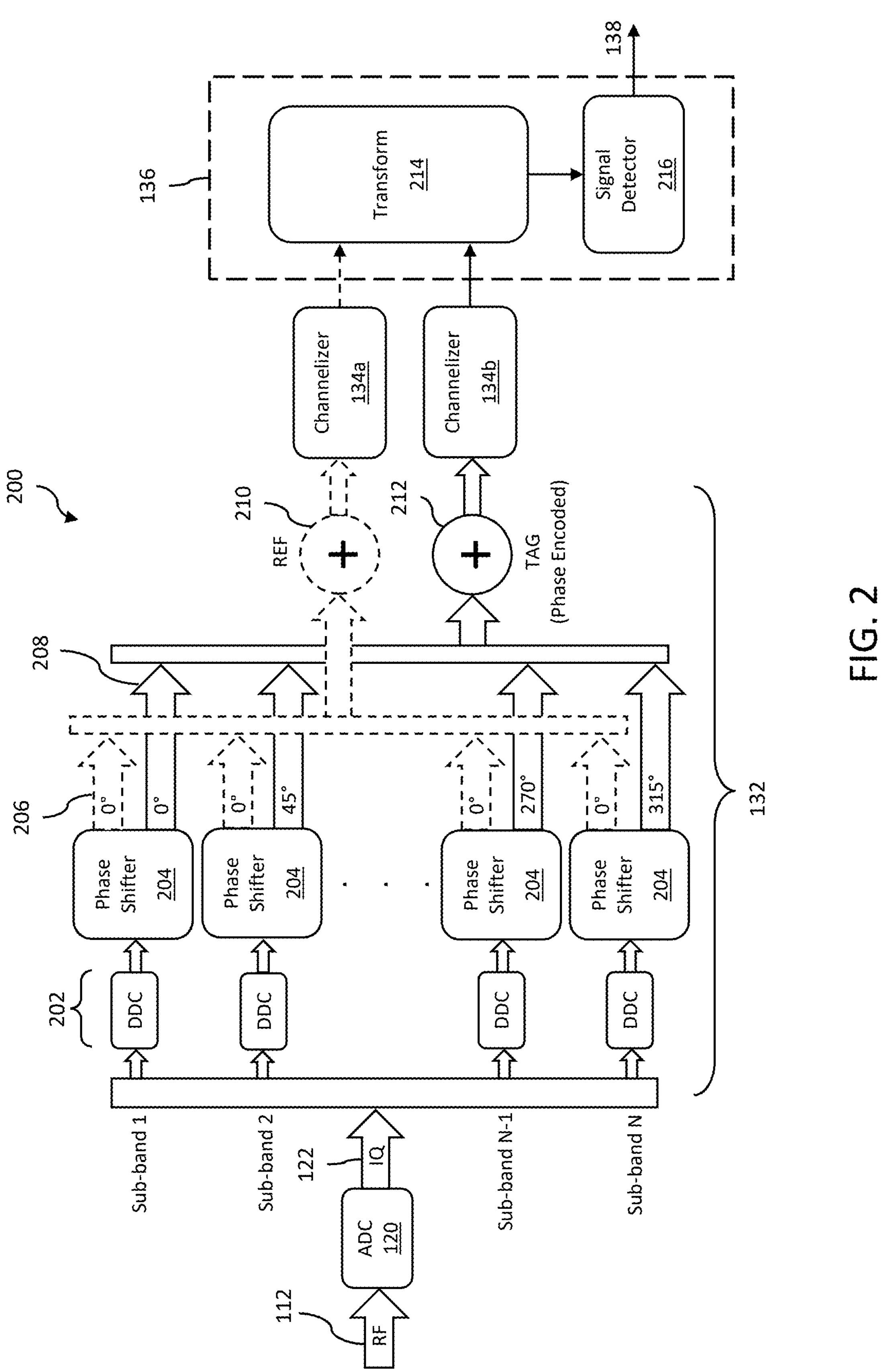
FIG. 2 is a block diagram of one example of an RF signal processing system in accord with aspects of the present disclosure.

Referring now to FIG. 2, there is illustrated an RF signal processing system 200 that may form part of the RF digital receiver system 100, according to certain examples. As described above, the wide-band RF input signal 112 is digitized by the ADC 120 to produce the digital signal 122. In some examples, the digital signal 122 produced by the ADC 120 comprises full spectrum I/Q data representing the wide-band RF input signal 112.

As described above, the digital signal 122 is divided, by frequency, into a plurality of sub-bands, 1–N, and thus represents a multi-band digital input signal for a remainder of the RF signal processing system 200. Each sub-band 1–N represents a portion of the frequency bandwidth covering the wide-band RF input signal 112. N may be any integer number. In some examples, N=8 or N=4; however, in other examples, a different value, even or odd, for N may be used. In some examples, the number of individual ADCs used in the ADC 120 may depend, at least in part, on the number of sub-bands, N, to be produced. For example, if an individual ADC is capable of producing 4 sub-bands; however, N=8 in an application, then the ADC 120 may comprise two individual ADCs, each producing 4 of the 8 sub-bands. Various other examples will be appreciated, given the benefit of this disclosure.

According to certain examples, the individual sub-bands are down-converted by respective digital down-converters (DDCs) 202 to a common base band. In some examples in which the ADC 120 includes a plurality of ADCs (e.g., one for each sub-band), the DDCs 202 can be implemented within the bank of ADCs. Alternatively, a bank of DDCs 202 can be used in combination with a single ADC 120, as illustrated in FIG. 2. In further examples, a combination of the two arrangements can be implemented. The output signals from the DDCs 202 all have the same sample rate. Thus, the DDCs 202 may produce respective sampled digital signals that are all centered around a common base-band frequency (e.g., 0 Hz), but each containing frequency information corresponding to their respective portion of the frequency bandwidth of the wide-band RF input signal 112. For example, if each sub-band represents a 2 GHz portion of the wide-band RF input signal 112 (e.g., sub-band 0 covers the frequency range 2-4 GHz, sub-band 1 covers the frequency range 4-6 GHz, etc.), then each base-band digital signal output from the DDCs 202 may represent 2 GHz centered around 0 Hz (e.g., −1 GHz to 1 GHz); however, the digital data contained in each DDC output signal represents frequency information for the respective 2 GHz portion of the wide-band RF input signal (e.g., the digital signal for sub-band 0 contains frequency content for the 2-4 GHz range, the digital signal for sub-band 1 contains frequency content for the 4-6 GHz range, etc.).

The base-band output signals from the DDCs 202 are provided to respective phase shifters 204. The phase shifters 204 operate on the signals from the DDCs to generate a reference channel of data (represented by dashed lines in FIG. 2) and a phase-encoded, or "tagged" channel of data (represented by solid lines in FIG. 2). Thus, the phase shifters 204 produce, for each sub-band 1−N, a reference signal 206 and a phase-encoded (tagged) signal 208. In some examples, to produce the reference channel, the phase shifters 204 impart a zero degree (0°) phase offset (e.g., no phase shift) to the reference signals 206. However, in other examples, the phase shifters 204 may apply a phase offset other than 0° to the reference signals 206 (e.g., any phase shift from 0° to 360°), provided only that, for the reference channel, the same phase offset is applied for all sub-bands 1−N. To produce the tagged channel, the phase shifters 204 may apply a respective phase shift to the phase-encoded signals 208 that is unique for each sub-band. In the example illustrated in FIG. 2, the phase encoding scheme uses a 45° step between sub-channels for the phase shift applied by the phase shifters 204 to produce the tagged signals 208. Thus, in the illustrated example, for N=8, the phase shifts applied to produce the tagged signals 208 are 0° for sub-band 1, 45° for sub-band 2 . . . 270° for sub-band N−1 (e.g., sub-band 7), and 315° for sub-band N (e.g., sub-band 8). In some examples, the step or spacing in phase shift between the sub-bands may be determined by dividing 360 degrees by N (e.g., 360°/8=45°). However, in other examples, the step in phase shifts between sub-bands need not be directly tied to the value of N. For example, a 45° phase shift step may be used for systems in which N=4, 6, or some other value. Further, phase shift steps other than 45° can be used, such as 20°, 30°, etc. In some examples, the number of sub-bands (N) is dynamically configurable, optionally over very short time frames (e.g., seconds or milliseconds). In some instances, particularly where the value of N may be changing rapidly (e.g., on the order of milliseconds), the phase encoding scheme may remain constant (e.g., using a 45° step between sub-bands) while N changes. In other examples, the phase encoding scheme may vary, together with or separately from, changes in the number of sub-bands.

The combination of frequency division into the N sub-bands and applied phase-encoding may be referred to as "folding." Accordingly, the number of sub-bands, N, may also be referred to as the number of folds. The higher the number of folds (the higher the value of N), the noisier the signal into the detector 136 may be; however, higher N may lead to higher overall system power savings. Accordingly, the value of N may be chosen based on the needs or goals associated with any given application, for example.

Still referring to FIG. 2, in some examples, the system 200 includes a reference channel summer 210 and a tagged channel summer 212. The reference channel summer 210 sums the reference signals 206 from all the sub-bands to produce a reference channel signal that is provided to a first (reference channel) channelizer 134*a*. Similarly, the tagged channel summer 212 sums the phase encoded signals 208 from all the sub-bands to produce a tagged channel signal that is provided to a second (tagged channel) channelizer 134*b*. As shown in this example, the DDCs 202, the phase shifters 204, the reference channel summer 210, and the tagged channel summer 212 together implement the digital phase encoder 132 in the system 100 of FIG. 1. Other examples may be integrated or otherwise configured differently. For instance, in another example, the DDCs 202 may be implemented as part of the ADC 120, as described above. In yet another example, the reference channel summer 210 and the tagged channel summer 212 may be implemented as part of a channelizer block that includes channelizers 134*a-b*. More generally, the degree of integration and/or use of discrete componentry to implement the various functionalities described herein can vary from one example embodiment to the next.

The channelizers 134*a*, 134*b* divide the reference channel signal and the tagged channel signal, respectively, into a plurality of frequency bins. Each frequency bin represents a portion of the frequency bandwidth of the down-converted signals from the DDCs 202. For example, if the output sample rate from each DDC 202 is 2.5 GHz, and the channelizers 134*a*, 134*b* divide the reference channel signal and the tagged channel signal, respectively, into 128 frequency bins, then each bin represents a 19.5312 MHz portion the output spectrum of the respective DDC. The number of frequency bins may depend on the channelizer used and/or the application. For example, the number of frequency bins may be 64, 128, 256, etc. In some examples, the number of frequency bins is configurable (e.g., the channelizers 134 can be digitally programmed to adjust the number of frequency bins for a given application and/or processing cycle). Because the channelizers 134*a*, 134*b* operate on the reference channel signal and the tagged channel signal, respectively, (which, as described above, are summations of the reference signals 206 and tagged signals 208, respectively), individual frequency bins can contain signal from some or all of the sub-bands 1−N.

The output from at least one of the first and/or second channelizers 134*a*, 134*b* are provided to the detector 136. As described above, in some examples, the detector 136 performs pulse detection to detect one or more signals of interest. Due to the down-conversion and folding processes described above, frequency ambiguities may be introduced into the signal data processed by the detector 136. The detector 136 may perform delta phase measurements between the tagged channel and the reference channel, as described further below, to resolve such ambiguities and estimate a true RF frequency of detected signals of interest. In some examples, the detector 136 is coupled to the output of one or both of the first channelizer 134*a* and/or the second channelizer 134*b*, and time-coincident samples of the signals from both channelizers 134*a*, 134*b* are compared to generate the delta phase measurements. It will further be appreciated that in some examples, the channelizers 134 may be omitted and the detector 136 may operate on the summed signals output from the reference channel summer 210 and the tagged channel summer 212. Channelization adds frequency selectivity, which may aid in significantly increasing the probability of detecting a signal of interest. However, the sub-band phase encoding and superposition techniques described above may be implemented in RF systems without the channelizers 134.

According to certain examples, the detector 136 includes a transform block 214. As described above, in some examples, the digital signal 122 from the ADC 120 comprises I/Q data. Therefore, the outputs from the channelizers 134*a*, 134*b* may also be in I/Q format. In some examples, a signal detector 216 may operate on the data in I/Q format to detect pulses corresponding to potential signals of interest and to determine the RF frequencies of such signals. However, in other examples, the transform block 214 is used to convert the data from the channelizers 134*a*, 134*b* from I/Q format into amplitude and phase. The signal detector 216 performs phase comparisons between the reference channel and the tagged channel to detect and/or characterize (e.g., estimate the frequency of) signals of interest, as described further below. In some examples, pulse detection may be performed based on the amplitude data, for example, by detecting signals with amplitudes above a certain threshold. In some examples, the transform block 214 includes a coordinate rotation digital computer (CORDIC). A CORDIC may offer a hardware-efficient approach for performing various operations, such as vector rotations or trigonometric, hyperbolic, and/or logarithm functions, including the conversion from IQ data to magnitude and phase. For example, a CORDIC may generally be faster than other approaches when a hardware multiplier is not available (e.g., a microcontroller), or when the number of gates required to implement the function(s) supported by the CORDIC should be minimized (e.g., in an FPGA or ASIC implementation). However, in other examples, the transform block 214 may be implemented in another manner, using hardware, firmware, software, or any combination thereof.

According to certain examples, the signal detector 216 implements pulse detection to detect pulses in the signals from the channelizers 134*a*, 134*b*. These pulses may represent signals of interest in the wide-band RF input signal 112. When a pulse is detected, the original frequency can be resolved by taking a delta phase measurement between the reference channel and tagged channel contributions in the frequency bin(s) in which the pulse is detected. For example, the signal detector 216 can be configured to compare the phase of signals present in the same frequency bin in the reference channel (e.g., output from the first channelizer 134*a*) and the tagged channel (e.g., output from the second channelizer 134*b*). Because the tagged signals 208 were encoded with unique phase shifts (per sub-band) relative to the reference signals 206, the difference (delta) in the phase between the two channels identifies the sub-band in which the detected pulse originated. The frequency bin identifies the portion of the frequency spectrum covered by that sub-band in which the pulse originated. For example, using the example described above, if the delta phase measurement identifies sub-band 1 (e.g., covering a 4-6 GHz portion of the frequency band-width of the wide-band RF input signal 112) as the source of a detected pulse, the frequency bin identifies the portion of that range (e.g., which 19.5312 MHz portion of the 4-6 GHz range, for 128 frequency bins and a 2.5 GHz DDC output sample rate) in which the pulse originated. Thus, based on the frequency bin in which the pulse was detected and the delta phase measurement, the original RF frequency range of the detected signal of interest in the wide-band RF input signal 112 can be determined.

In some instances, there may be multiple signals of interest present in the wide-band RF input signal 112. However, in many applications, it is likely that the distribution of such signals over the full frequency range represented by the wide-band RF input signal 112 and over the time frame during which the wide-band RF input signal is monitored will be relatively sparse. As a result, based on the sampling performed by the ADC 120, the folding (division into N sub-bands) of the digital signal 122, and subsequent division of the summed reference and tagged signals into a plurality of discrete frequency bins by the channelizers 134, the probability of two signals of interest overlapping in the same frequency bin and the same sub-band during the same sample period may be relatively low. Accordingly, the digital phase encoding scheme and delta phase measurement techniques described herein may successfully detect multiple signals of interest in the wide-band RF input signal 112, provided that there is at least a small offset in time (e.g., between different samples of the wide-band RF input signal 112 taken by the ADC 120) and/or frequency (and thus placement in a particular frequency bin and/or sub-band) among the multiple signals of interest.

Figure 3:
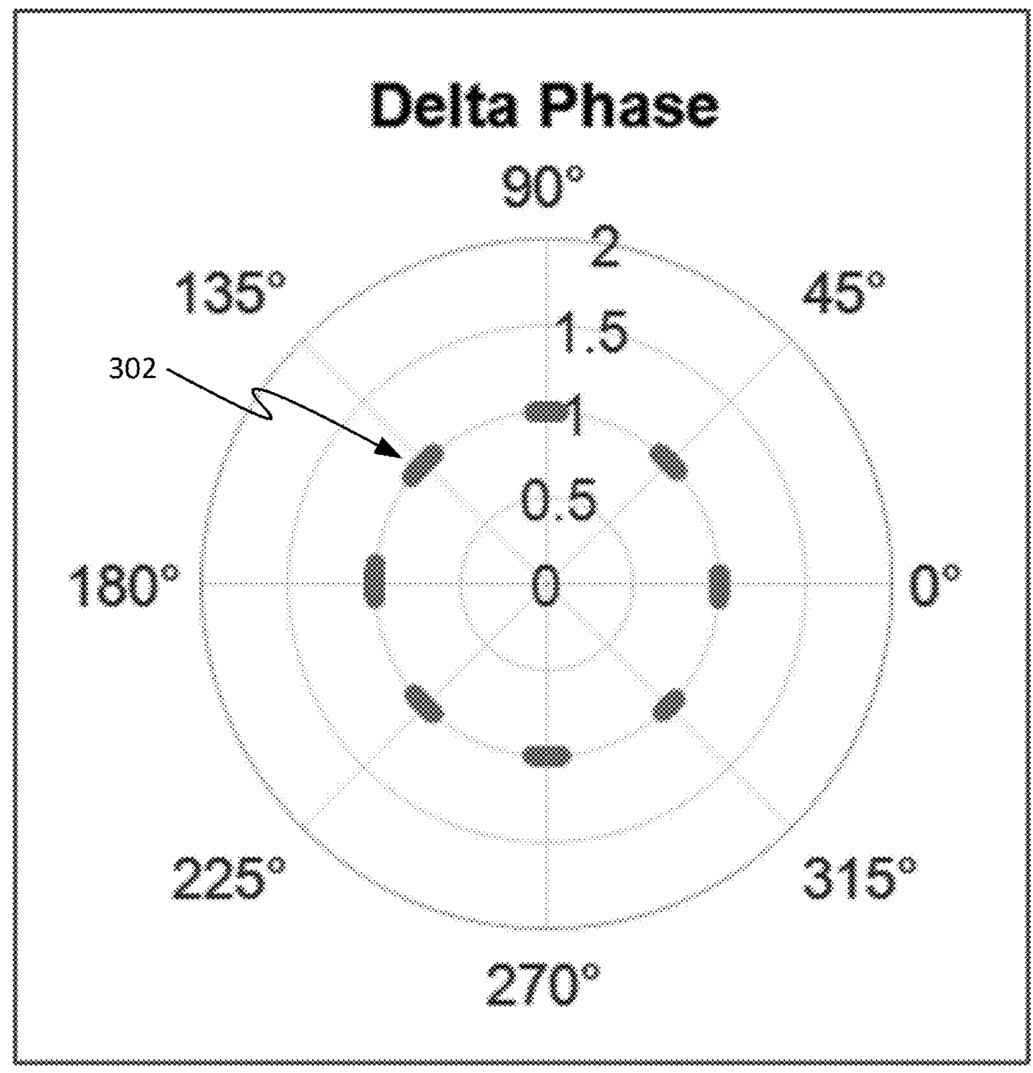
FIG. 3 is a polar coordinate graph illustrating an example of simulated delta phase measurement results, according to aspects of the present disclosure.

In some examples, using a digital phase encoding scheme as described herein may offer several advantages. For example, the phase shifters 204 can be digitally programmed to apply the unique phase shifts to each sub-band, and therefore, can be easily tailored for different applications, and/or easily changed (e.g., digitally reprogrammed). Furthermore, as described above, the phase encoding can be accomplished with high phase accuracy. For example, referring to FIG. 3, there is illustrated a polar plot showing groupings of delta phase measurements 302 (as may be obtained at the signal detector 216, for example) at 45 degree spacing. In the example illustrated in FIG. 3, the data was obtained using the following simulation conditions. The simulated wide-band RF input signal 112 was a linear frequency modulated (LFM) signal (e.g., sometimes referred to as a linear chirp) covering a frequency range of 1 GHz to 32 GHz. This type of input signal should produce delta phase measurements in discrete steps, corresponding to the individual sub-bands, as indeed may be seen in FIG. 3. In this example, the simulated system used 8 sub-bands, with a 45 degree step (or spacing) in the phase shift applied by the phase shifters 204 to the different sub-bands. As can be seen in FIG. 3, the polar plot shows a clean grouping of sets of delta phase measurements 302 for each sub-band at the 45 degree spacings. This demonstrates that the system 200 is non-self-corrupting, meaning that little to no noise is introduced by the digital phase encoding process. As a result, even signals with low SNR may be accurately encoded and decoded using the all-digital techniques described herein. Further, the clean, distinct groupings of the delta phase measurements allows the original RF frequencies of detected signals of interest to be resolved accurately. In contrast, analog encoding systems may produce delta phase measurement groupings that are not cleanly spaced, but instead "bleed" or "smudge" into one another. This results in ambiguity in the decoding process that cannot be resolved, leading to potential inaccuracies in determining the RF frequencies of detected signals of interest. Furthermore, using the digital phase encoding techniques described herein, the number of sub-bands, N, can be relatively high, such as the 8 sub-bands illustrated in FIG. 3, or higher. In contrast, achieving even four sub-bands with reasonable accuracy in the encoding can be difficult using analog phase encoding techniques.

Signal Processing Techniques

Figure 4:
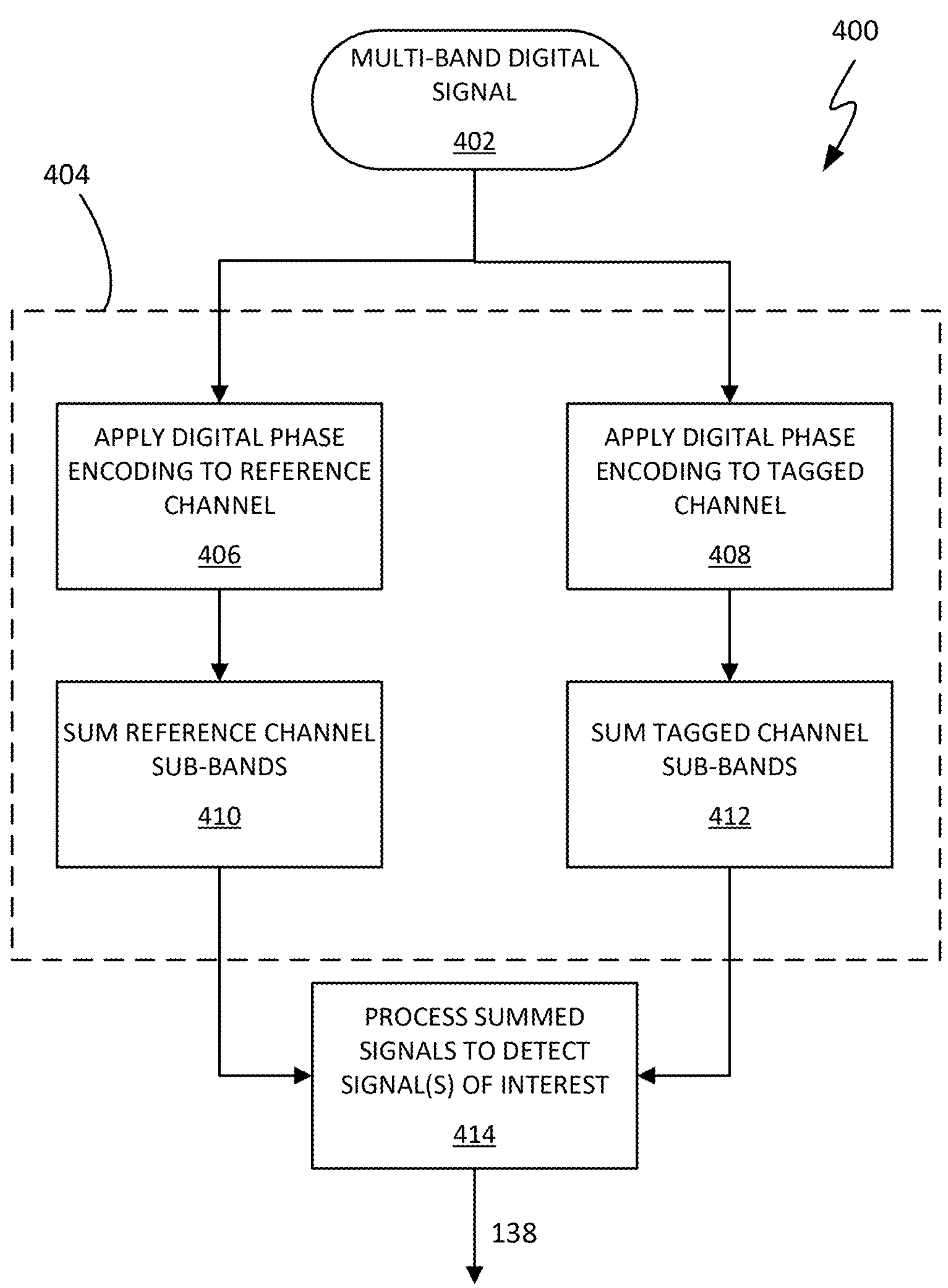
FIG. 4 is a process flow diagram of one example of a method of applying digital phase encoding in accord with aspects of the disclosed technology.

Referring to FIG. 4, there is depicted a process flow diagram of a method 400 of applying digital phase encoding and signal detection, in accordance with one example. At operation 402, a multi-band digital input signal is received. In some examples, the multi-band digital input signal is a base-band signal, such as the down-converted digital signal 122 described above, for example. As described above, the multi-band digital input signal may comprise a plurality (N) of sub-bands, each of which contains frequency content corresponding to a respective portion (frequency range) of a wide-band RF signal.

At operation 404, a digital phase encoding scheme is applied to the multi-band digital input signal. As described above, in certain examples, the digital phase encoding process includes producing a reference channel of data and a tagged channel of data, the reference channel and the tagged channel both including signals representing each sub-band of the plurality of sub-bands present in the multi-band digital input signal received at operation 402.

Accordingly, operation 404 may include an operation 406 of applying digital phase encoding to produce the reference channel of data. Concurrently, operation 404 may include an operation 408 of applying digital phase encoding to the produce the tagged channel of data. Operations 406 and 408 may be performed by the phase shifters 204 described above with reference to FIG. 2, for example. In some examples, operation 406 includes applying a common phase offset to reference signals for each sub-band. For example, as described above, the phase shifters 204 can apply a zero degree phase offset in each sub-band 1-N, to produce the reference signals 206 (e.g., no phase encoding is applied to the reference channel, and operation 406 may be omitted). However, in other examples, the phase offset applied to the reference signals 206 can be a phase shift other than zero degrees. Similarly, at operation 408, the phase shifters 204 can apply a unique phase shift for each sub-band to produce the tagged signals 208, as described above.

At operation 410, the reference signals (e.g., references signals 206) from all sub-bands are summed together (e.g., using the first summer 210) to produce a summed reference signal. Similarly, at operation 412, the tagged signals (e.g., phase-encoded signals 208) can be summed together (e.g., using the second summer 212) to produce a summed tagged signal.

At operation 414, the summed reference signal and summed tagged signal can be processed to detect one or more signals of interest. For example, as described above, operation 416 may include applying pulse detection to detect one or more pulses that may correspond to signals of interest in the wide-band RF signal that is represented by the multi-band digital input signal. When pulse is detected, delta phase measurements between the reference channel and the tagged channel can be used to resolve the RF frequency of the corresponding signal of interest, as described above and in further detail below with reference to FIG. 5.

Figure 5:
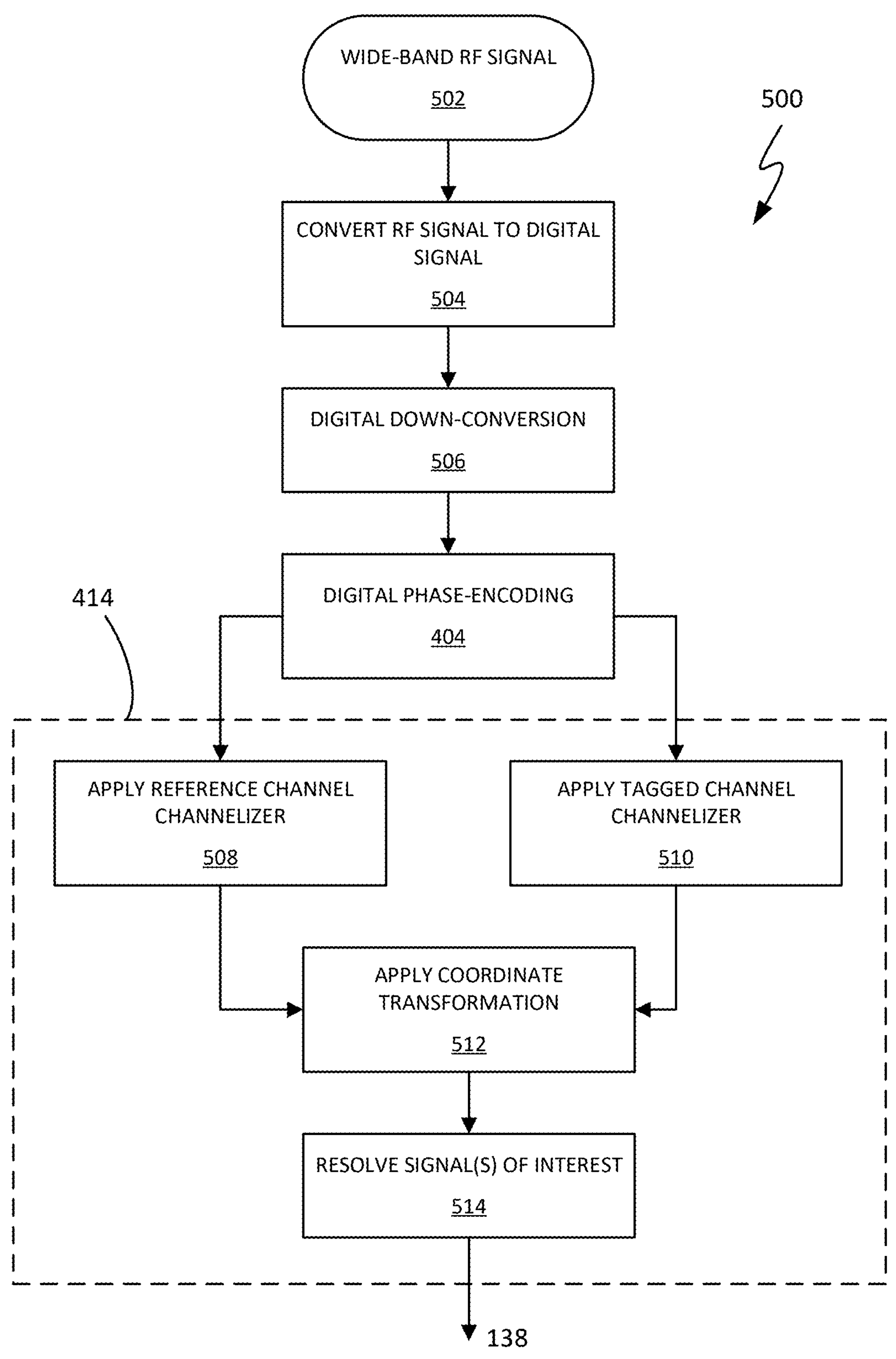
FIG. 5 is a process flow diagram of one example of a signal processing method in accord with aspects of the disclosed technology.

FIG. 5 illustrates a process flow diagram for an example of a signal processing method 500 that may include the digital phase encoding and signal detection techniques implemented in examples of the method 400. Examples of the signal processing method 500 may be performed by the system 200, for example.

At operation 502, a wide-band RF input signal (e.g., the signal 112) is received.

At operation 504, the wide-band RF input signal is digitized (e.g., using the ADC 120) to produce a digital signal, such as the digital signal 122. As described above, the digital signal 122 may include multiple frequency sub-bands, each of which represents a portion of the full band-width of the wide-band RF input signal.

At operation 506, the digital signal 122 is down-converted to base band, for example, using the DDCs 202. A result of operation 506 may be to produce the multi-band digital input signal received at operation 402. Accordingly, the method 500 may include the operation 404 of applying digital phase encoding, as described above.

According to certain examples, operation 414 (FIG. 4) may include operation 508 of applying/using a digital channelizer (e.g., the first channelizer 134*a*) to divide the summed reference signal into a plurality of frequency bins. Similarly, operation 414 (FIG. 4) may further include operation 510 of applying/using another digital channelizer (e.g., the second channelizer 134*b*) to divide the summed tagged signal into the plurality of frequency bins.

As described above, in some examples, the digital signal produced at operation 504 is an I/Q signal. Accordingly, to allow phase comparisons between signals in the tagged and reference channels to be performed at operation 514, the method 500 may include an operation 512 of applying a coordinate transformation operation to convert the I/Q data into amplitude and phase data. As described above, in some examples, operation 512 can be performed using a CORDIC, although other implementations may also be used.

As described above, in some examples, operation 414 includes detecting (e.g., based on amplitude data acquired at operation 512) one or more pulses that may correspond to signals of interest in the wide-band RF input signal 112 (received at operation 502). Further, when a pulse is detected, delta phase measurements can be performed in the corresponding frequency bin at operation 514. By comparing the phase of the tagged channel signal data in a frequency bin to the reference channel signal data in the same frequency bin, the phase difference (delta) between the two channels can be determined. This phase difference may correspond to the phase shift applied to the tagged signal 208 (e.g., at operation 408) in one of the sub-bands. Thus, based on known, unique phase shifts applied at operation 408 to the tagged signals 208 for each of the sub-bands, and a known phase offset applied at operation 406 to the reference signals 206, the delta phase measurements can identify the sub-band to which a detected pulse corresponds. Accordingly, based on the delta phase measurements and the frequency bins, the true RF frequency range of a detected signal of interest can be resolved.

The method 500 may produce, as an output, the signal 138 that identifies (e.g., by frequency) any one or more detected signals of interest.

Thus, aspects and examples provide a digital RF compressive receiver architecture and associated all-digital signal processing techniques. As described above, in some examples, an incoming wide-band RF input signal 112 can be digitized by a high sample rate ADC 120, and digital phase encoding and subsequent decoding (e.g., recovery of an estimated true RF frequency of one or more detected signals of interest in the wide-band RF input signal) can be performed in the digital domain by the digital processing module 130. In some examples, the digital processing module 130 is implemented using an FPGA; however, other examples may use an application specific integrated circuit (ASIC) or purpose-built semiconductor, microprocessor, and/or software implementations, as discussed below with reference to FIG. 6. Examples of the ADC system disclosed herein advantageously may be used for sensing wide band-width regions of the electromagnetic spectrum that may contain multiple continuous wave or modulated RF signals of interest. The ability to process multiple RF input signals simultaneously may enable the system to function in contested environments, which may be beneficial for certain applications.

Example Computing Platform

FIG. 6 illustrates an example computing platform 600 that can be used in the RF digital receiver system 100 to implemented components and/or functionality described herein. In some examples, computing platform 600 may host, or otherwise be incorporated into a personal computer, workstation, server system, laptop computer, ultra-laptop computer, tablet, touchpad, portable computer, handheld computer, palmtop computer, personal digital assistant (PDA), cellular telephone, combination cellular telephone and PDA, smart device (for example, smartphone or smart tablet), mobile internet device (MID), messaging device, data communication device, imaging device, wearable device, embedded system, and so forth. Any combination of different devices may be used in certain examples. The computing platform 600 may host a controlled area network (CAN) used on board a vehicle. In some examples, the computing platform 600 represents one system in a network of systems coupled together via a CAN bus.

In some examples, the computing platform 600 may comprise any combination of a processor 602, a memory 604, an example of the digital processing module 130, a network interface 606, an input/output (I/O) system 608, a user interface 610, and a storage system 612. In some examples, one or more components of the digital processing module 130 are implemented as part of the processor 602, or alternatively, the processor 602 (or a part thereof) may be implemented as part of the digital processing module 130. As shown in FIG. 6, a bus and/or interconnect 616 is also provided to allow for communication between the various components listed above and/or other components not shown. The computing platform 600 can be coupled to a network 618 through the network interface 606 to allow for communications with other computing devices, platforms, or resources. Other componentry and functionality not reflected in the block diagram of FIG. 6 will be apparent in light of this disclosure, and it will be appreciated that other examples are not limited to any particular hardware configuration.

The processor 602 can be any suitable processor and may include one or more coprocessors or controllers to assist in control and processing operations associated with the computing platform 600. In some examples, the processor 602 may be implemented as any number of processor cores. The processor (or processor cores) may be any type of processor, such as, for example, a micro-processor, an embedded processor, a digital signal processor (DSP), a graphics processor (GPU), a network processor, a field programmable gate array or other device configured to execute code. The processors may be multithreaded cores in that they may include more than one hardware thread context (or "logical processor") per core.

The memory 604 can be implemented using any suitable type of digital storage including, for example, flash memory and/or random access memory (RAM). In some examples, the memory 604 may include various layers of memory hierarchy and/or memory caches as are known to those of skill in the art. The memory 604 may be implemented as a volatile memory device such as, but not limited to, a RAM, dynamic RAM (DRAM), or static RAM (SRAM) device. The storage system 612 may be implemented as a non-volatile storage device such as, but not limited to, one or more of a hard disk drive (HDD), a solid-state drive (SSD), a universal serial bus (USB) drive, an optical disk drive, tape drive, an internal storage device, an attached storage device, flash memory, battery backed-up synchronous DRAM (SDRAM), and/or a network accessible storage device. In some examples, the storage system 612 may comprise technology to increase the storage performance enhanced protection for valuable digital media when multiple hard drives are included.

The processor 602 may be configured to execute an Operating System (OS) 614 which may comprise any suitable operating system, such as Google Android (Google Inc., Mountain View, CA), Microsoft Windows (Microsoft Corp., Redmond, WA), Apple OS X (Apple Inc., Cupertino, CA), Linux, or a real-time operating system (RTOS). As will be appreciated in light of this disclosure, the techniques provided herein can be implemented without regard to the particular operating system provided in conjunction with the computing platform 600, and therefore may also be implemented using any suitable existing or subsequently-developed platform.

The network interface 606 can be any appropriate network chip or chipset which allows for wired and/or wireless connection between other components of the computing platform 600 and/or the network 618, thereby enabling the computing platform 600 to communicate with other local and/or remote computing systems, servers, cloud-based servers, and/or other resources. Wired communication may conform to existing (or yet to be developed) standards, such as, for example, Ethernet. Wireless communication may conform to existing (or yet to be developed) standards, such as, for example, cellular communications including LTE (Long Term Evolution), Wireless Fidelity (Wi-Fi), Bluetooth, and/or Near Field Communication (NFC). Exemplary wireless networks include, but are not limited to, wireless local area networks, wireless personal area networks, wireless metropolitan area networks, cellular networks, and satellite networks.

The I/O system 608 may be configured to interface between various I/O devices and other components of the computing platform 600. I/O devices may include, but not be limited to, a user interface 610. The user interface 610 may include devices (not shown) such as a display element, touchpad, keyboard, mouse, and speaker, etc. The I/O system 608 may include a graphics subsystem configured to perform processing of images for rendering on a display element. Graphics subsystem may be a graphics processing unit or a visual processing unit (VPU), for example. An analog or digital interface may be used to communicatively couple graphics subsystem and the display element. For example, the interface may be any of a high definition multimedia interface (HDMI), DisplayPort, wireless HDMI, and/or any other suitable interface using wireless high definition compliant techniques. In some examples, the graphics subsystem could be integrated into the processor 602 or any chipset of the computing platform 600.

It will be appreciated that in some examples, the various components of the computing platform 600 may be combined or integrated in a system-on-a-chip (SoC) architecture. In some examples, the components may be hardware components, firmware components, software components or any suitable combination of hardware, firmware or software.

In various examples, the computing platform 600 may be implemented as a wireless system, a wired system, or a combination of both. When implemented as a wireless system, the computing platform 600 may include components and interfaces suitable for communicating over a wireless shared media, such as one or more antennae, transmitters, receivers, transceivers, amplifiers, filters, control logic, and so forth. An example of wireless shared media may include portions of a wireless spectrum, such as the radio frequency spectrum and so forth. When implemented as a wired system, the computing platform 600 may include components and interfaces suitable for communicating over wired communications media, such as input/output adapters, physical connectors to connect the input/output adaptor with a corresponding wired communications medium, a network interface card (NIC), disc controller, video controller, audio controller, and so forth. Examples of wired communications media may include a wire, cable metal leads, printed circuit board (PCB), backplane, switch fabric, semiconductor material, twisted pair wire, coaxial cable, fiber optics, and so forth.

Unless specifically stated otherwise, it may be appreciated that terms such as "processing," "computing," "calculating," "determining," or the like refer to the action and/or process of a computer or computing system, or similar electronic computing device, that manipulates and/or transforms data represented as physical quantities (for example, electronic) within the registers and/or memory units of the computer system into other data similarly represented as physical quantities within the registers, memory units, or other such information storage transmission or displays of the computer system. The examples are not limited in this context.

The terms "circuit" or "circuitry," as used in any example herein, may comprise, for example, singly or in any combination, hardwired circuitry, programmable circuitry such as computer processors comprising one or more individual instruction processing cores, state machine circuitry, and/or firmware that stores instructions executed by programmable circuitry. The circuitry may include a processor and/or controller configured to execute one or more instructions to perform one or more operations described herein. The instructions may be embodied as, for example, an application, software, firmware, etc. configured to cause the circuitry to perform any of the aforementioned operations. Software may be embodied as a software package, code, instructions, instruction sets and/or data recorded on a computer-readable storage device. Software may be embodied or implemented to include any number of processes, and processes, in turn, may be embodied or implemented to include any number of threads, etc., in a hierarchical fashion. Firmware may be embodied as code, instructions or instruction sets and/or data that are hard-coded (e.g., nonvolatile) in memory devices. The circuitry may, collectively or individually, be embodied as circuitry that forms part of a larger system, for example, an integrated circuit (IC), an application-specific integrated circuit (ASIC), a system on-chip (SoC), desktop computers, laptop computers, tablet computers, servers, smart phones, etc. Other examples may be implemented as software executed by a programmable control device. As described herein, various examples may be implemented using hardware elements, software elements, or any combination thereof. Examples of hardware elements may include processors, microprocessors, circuits, circuit elements (e.g., transistors, resistors, capacitors, inductors, and so forth), integrated circuits, ASICs, programmable logic devices (PLD), DSPs, FPGAs, logic gates, registers, semiconductor device, chips, microchips, chip sets, and so forth.

Various examples may be implemented using hardware elements, software elements, or a combination of both. Examples of hardware elements may include processors, microprocessors, circuits, circuit elements (for example, transistors, resistors, capacitors, inductors, and so forth), integrated circuits, ASICs, programmable logic devices, digital signal processors, FPGAs, GPUs, logic gates, registers, semiconductor devices, chips, microchips, chipsets, and so forth. Examples of software may include software components, programs, applications, computer programs, application programs, system programs, machine programs, operating system software, middleware, firmware, software modules, routines, subroutines, functions, methods, procedures, software interfaces, application program interfaces, instruction sets, computing code, computer code, code segments, computer code segments, words, values, symbols, or any combination thereof. Determining whether an example is implemented using hardware elements and/or software elements may vary in accordance with any number of factors, such as desired computational rate, power level, heat tolerances, processing cycle budget, input data rates, output data rates, memory resources, data bus speeds, and other design or performance constraints.

Additional Examples

Example 1 is a radio frequency (RF) receiver system comprising: a plurality of digital phase shifters configured to apply a phase encoding scheme to a multi-band digital signal to produce a plurality of reference signals and a corresponding plurality of phase-encoded signals, each reference signal and each phase-encoded signal containing frequency information representing a respective sub-band of the multi-band digital signal; a first summer configured to sum the plurality of reference signals to produce a summed reference signal; a second summer configured to sum the plurality of phase-encoded signals to produce a summed phase-encoded signal; a first channelizer coupled to the first summer to receive the summed reference signal and configured to divide the summed reference signal by frequency into a plurality of frequency bins to produce reference channel data; a second channelizer coupled to the second summer to receive the summed phase-encoded signal and configured to divide the summed phase-encoded signal by frequency into the plurality of frequency bins to produce phase-encoded channel data; and a detector coupled to at least one of the first and second channelizers and configured to perform delta phase measurements using the reference channel data and the phase-encoded channel data to identify at least one signal of interest, wherein to perform the delta phase measurements includes to compare a phase of one or more signals in the phase-encoded channel data with a phase of one or more corresponding signals in the reference channel data to estimate an original RF frequency of the at least one signal of interest.

Example 2 includes the RF receiver system of Example 1, wherein the multi-band digital signal comprises N sub-bands, N being an integer number, and wherein the plurality of digital phase shifters comprises N digital phase shifters, each digital phase shifter configured to produce a respective reference signal and a respective phase-encoded signal for a respective one of the N sub-bands.

Example 3 includes the RF receiver system of Example 2, wherein to produce the plurality of reference signals, the plurality of digital phase shifters are configured to apply a zero degree phase shift to the respective reference signals, and wherein to produce the plurality of phase-encoded signals, each respective digital phase shifter is configured to apply a unique phase shift to the respective phase-encoded signal, the unique phase shifts being spaced apart in phase from one another by a step value.

Example 4 includes the RF receiver system of Example 3, wherein the step value is determined by 360 degrees divided by N.

Example 5 includes the RF receiver system of one of Examples 3 or 4, wherein the detector is configured to compare the phase of one or more signals in the phase-encoded channel data with the phase of one or more corresponding signals in the reference channel data to determine a phase shift of the one or more signals in the phase-encoded channel data, and to identify, based on the phase shift, a sub-band from among the plurality of sub-bands corresponding to the original RF frequency of the at least one signal of interest.

Example 6 includes the RF receiver system of Example 5, wherein the detector is configured to detect a pulse representing the at least one signal of interest in a particular frequency bin from among the plurality of frequency bins, and estimate the original RF frequency of the at least one signal of interest based on the sub-band and the particular frequency bin.

Example 7 includes the RF receiver system of any one of Examples 1-6, wherein N=4 or N=8.

Example 8 includes RF receiver system of any one of Examples 1-7, wherein the multi-band digital signal comprises I/Q signal data, and wherein the detector is configured to apply a coordinate transform process to convert the I/Q signal data into signal amplitude data and signal phase data.

Example 9 includes the RF receiver system of any one of Examples 1-8, further comprising a plurality of digital down-converters configured to down-convert the multi-band digital signal in frequency to a base band.

Example 10 includes the RF receiver system of any one of Examples 1-9, further comprising an analog-to-digital converter configured to sample an RF input signal to produce the multi-band digital signal.

Example 11 includes the RF receiver system of Example 9, further comprising an analog-to-digital converter configured to sample an RF input signal to produce the multi-band digital signal, wherein one or more of the plurality of digital down-converters are part of the analog-to-digital converter.

Example 12 is a computer program product including one or more non-transitory machine-readable mediums encoded with instructions that when executed by one or more processors cause a process to be carried out for determining a frequency of a radio frequency (RF) signal. The process comprises receiving a set of N digital signals, N being an integer number, wherein each digital signal represents a respective frequency sub-band of a frequency bandwidth covered by the set of N digital signals in combination; applying a common phase offset to the set of N digital signals to produce N reference signals; individually applying a different phase shift to each individual digital signal in the set of N digital signals to produce N phase-encoded signals, wherein individual phase-encoded signals are separated in phase from one another by a step value; summing the N reference signals to produce a summed reference signal; summing the N phase-encoded signals to produce a summed phase-encoded signal; dividing the summed reference signal and the summed phase-encoded signal into a plurality of frequency bins; detecting, in a particular frequency bin from among the plurality of frequency bins, a pulse representing the RF signal; performing delta phase measurements between the summed reference signal and the summed phase-encoded signal in the particular frequency bin; and based on the delta phase measurements, determining the frequency of the RF signal.

Example 13 includes the computer program product of Example 12, wherein the step value is equal to 360 degrees divided by N.

Example 14 includes the computer program product of one of Examples 12 or 13, wherein the N digital signals comprise I/Q signal data, and wherein the process further comprises transforming the summed reference signal and the summed phase-encoded signal from I/Q format into amplitude and phase data.

Example 15 includes the computer program product of Example 14, wherein performing the delta phase measurements includes comparing a phase of a component of the summed phase-encoded signal with a phase of a corresponding component of the summed reference signal to determine a phase difference, and wherein determining the frequency of the RF signal comprises identifying the respective frequency sub-band of the individual phase-encoded signal having a phase shift that matches the phase difference.

Example 16 includes the computer program product of any one of Examples 12-15, wherein the process further comprises setting a value of N.

Example 17 includes the computer program product of any one of Examples 12-16, wherein the process further comprises receiving a sampled data stream, and digitally down-converting the sampled data stream to a base band to produce the set of N digital signals.

Example 18 includes the computer program product of any one of Examples 12-17, wherein N=4 or N=8.

Example 19 includes the computer program product of any one of Examples 12-18, wherein the common phase offset is zero degrees.

Example 20 is an RF receiver comprising the computer program product of any one of Examples 12-19.

Example 21 is a radio frequency (RF) receiver system comprising: a plurality of digital phase shifters configured to produce a plurality of reference signals and a plurality of phase-encoded signals, wherein each digital phase shifter is configured to receive a respective digital input signal, to apply a phase offset to the respective digital input signal to produce a respective reference signal, and to apply a unique phase shift to the respective digital input signal to produce a respective phase-encoded signal; wherein the phase offset is common to all respective reference signals, and wherein the unique phase shift applied by each digital phase shifter to the respective phase-encoded signals is selected according to a phase encoding scheme; a first summer configured to combine the plurality of reference signals to produce a summed reference signal; a second summer configured to combine the plurality of phase-encoded signals to produce a summed phase-encoded signal; a channelizer sub-system configured to divide the summed reference signal and the summed phase-encoded signal into a plurality of frequency bins; and a detector configured to detect, in a particular frequency bin from among the plurality of frequency bins, a pulse representing an RF signal represented in one of the digital input signals and to perform delta phase measurements between the summed reference signal and the summed phase-encoded signal in the particular frequency bin to estimate a frequency of the RF signal.

Example 22 includes the RF receiver system of Example 21, wherein each respective digital input signal comprises frequency content representing a portion of an RF bandwidth, and wherein the detector is configured to estimate the frequency of the RF signal by determining, based on the delta phase measurements, the portion of the RF bandwidth corresponding to the digital input signal in which the RF signal is represented.

Example 23 includes the RF receiver system of one of Examples 21 or 22, comprising a plurality of digital down-converters, each configured to receive a respective portion of a digital data stream and to down-convert the respective portion of the digital data stream to base-band to produce the respective digital input signal.

Example 24 includes the RF receiver system of Example 23, comprising at least one analog-to-digital converter configured to sample a wide-band RF input signal to produce the digital data stream.

Example 25 includes the RF receiver system of Example 24, wherein at least one of the plurality of digital down converters is part of the at least one analog-to-digital converter.

Example 26 includes the RF receiver system of any one of Examples 21-25, wherein the digital input signals comprise I/Q signal data, and wherein the detector is configured to transform the summed reference signal and the summed phase-encoded signal from I/Q format into amplitude and phase data.

Example 27 includes the RF receiver system of any one of Examples 21-26, wherein the phase offset is zero degrees.

Having described above several aspects of at least one example, it is to be appreciated various alterations, modifications, and improvements will readily occur to those skilled in the art. Such alterations, modifications, and improvements are intended to be part of this disclosure. Accordingly, the foregoing description and drawings of various examples are presented by way of example only. These examples are not intended to be exhaustive or to limit examples to the precise forms disclosed. The methods and apparatuses described herein are capable of implementation in other examples and of being practiced or of being carried out in various ways. In addition, the phraseology and terminology used herein is for the purpose of description and should not be regarded as limiting. Any references to examples, components, elements, or acts of the systems and methods herein referred to in the singular can also embrace examples including a plurality, and any references in plural to any example, component, element or act herein can also embrace examples including only a singularity. References in the singular or plural form are not intended to limit the presently disclosed systems or methods, their components, acts, or elements. The use herein of “including”, “comprising”, “having”, “containing”, “involving”, and variations thereof is meant to encompass the items listed thereafter and equivalents thereof as well as additional items. References to “or” can be construed as inclusive so that any terms described using “or” can indicate any of a single, more than one, and all of the described terms.

What is claimed is:

1. A radio frequency (RF) receiver system comprising:

a plurality of digital phase shifters configured to apply a phase encoding scheme to a multi-band digital signal to produce a plurality of reference signals and a corresponding plurality of phase-encoded signals, each reference signal and each phase-encoded signal containing frequency information representing a respective sub-band of the multi-band digital signal;

a first summer configured to sum the plurality of reference signals to produce a summed reference signal;

a second summer configured to sum the plurality of phase-encoded signals to produce a summed phase-encoded signal;

a first channelizer coupled to the first summer to receive the summed reference signal and configured to divide the summed reference signal by frequency into a plurality of frequency bins to produce reference channel data;

a second channelizer coupled to the second summer to receive the summed phase-encoded signal and configured to divide the summed phase-encoded signal by frequency into the plurality of frequency bins to produce phase-encoded channel data; and a detector coupled to at least one of the first and second channelizers and configured to perform delta phase measurements using the reference channel data and the phase-encoded channel data to identify at least one signal of interest, wherein to perform the delta phase measurements includes to compare a phase of one or more signals in the phase-encoded channel data with a phase of one or more corresponding signals in the reference channel data to estimate an original RF frequency of the at least one signal of interest.

2. The RF receiver system of claim 1, wherein the multi-band digital signal comprises N sub-bands, N being an integer number; and wherein the plurality of digital phase shifters comprises N digital phase shifters, each digital phase shifter configured to produce a respective reference signal and a respective phase-encoded signal for a respective one of the N sub-bands.

3. The RF receiver system of claim 2, wherein to produce the plurality of reference signals, the plurality of digital phase shifters are configured to apply a zero degree phase shift to the respective reference signals; and wherein to produce the plurality of phase-encoded signals, each respective digital phase shifter is configured to apply a unique phase shift to the respective phase-encoded signal, the unique phase shifts being spaced apart in phase from one another by a step value.

4. The RF receiver system of claim 3, wherein the step value is determined by 360 degrees divided by N.

5. The RF receiver system of claim 3, wherein the detector is configured to:

compare the phase of one or more signals in the phase-encoded channel data with the phase of one or more corresponding signals in the reference channel data to determine a phase shift of the one or more signal sin the phase-encoded channel data; and identify, based on the phase shift, a sub-band from among the plurality of sub-bands corresponding to the original RF frequency of the at least one signal of interest.

6. The RF receiver system of claim 5, wherein the detector is configured to:

detect a pulse representing the at least one signal of interest in a particular frequency bin from among the plurality of frequency bins; and estimate the original RF frequency of the at least one signal of interest based on the sub-band and the particular frequency bin.

7. The RF receiver system of claim 1, wherein the multi-band digital signal comprises I/Q signal data; and wherein the detector is configured to apply a coordinate transform process to convert the I/Q signal data into signal amplitude data and signal phase data.

8. The RF receiver system of claim 1, further comprising:

a plurality of digital down-converters configured to down-convert the multi-band digital signal in frequency to a base band.

9. The RF receiver system of claim 1, further comprising:

an analog-to-digital converter configured to sample an RF input signal to produce the multi-band digital signal.

10. A computer program product including one or more non-transitory machine-readable mediums encoded with instructions that when executed by one or more processors cause a process to be carried out for determining a frequency of a radio frequency (RF) signal, the process comprising:

receiving a set of N digital signals, N being an integer number, wherein each digital signal represents a respective frequency sub-band of a frequency bandwidth covered by the set of N digital signals in combination;

applying a common phase offset to the set of N digital signals to produce N reference signals;

individually applying a different phase shift to each individual digital signal in the set of N digital signals to produce N phase-encoded signals, wherein individual phase-encoded signals are separated in phase from one another by a step value;

summing the N reference signals to produce a summed reference signal;

summing the N phase-encoded signals to produce a summed phase-encoded signal;

dividing the summed reference signal and the summed phase-encoded signal into a plurality of frequency bins;

detecting, in a particular frequency bin from among the plurality of frequency bins, a pulse representing the RF signal;

performing delta phase measurements between the summed reference signal and the summed phase-encoded signal in the particular frequency bin; and based on the delta phase measurements, determining the frequency of the RF signal.

11. The computer program product of claim 10, wherein the step value is equal to 360 degrees divided by N.

12. The computer program product of claim 10, wherein the N digital signals comprise I/Q signal data, and wherein the process further comprises:

transforming the summed reference signal and the summed phase-encoded signal from I/Q format into amplitude and phase data.

13. The computer program product of claim 12, wherein performing the delta phase measurements includes comparing a phase of a component of the summed phase-encoded signal with a phase of a corresponding component of the summed reference signal to determine a phase difference; and wherein determining the frequency of the RF signal comprises identifying the respective frequency sub-band of the individual phase-encoded signal having a phase shift that matches the phase difference.

14. The computer program product of claim 10, wherein the process further comprises:

setting a value of N.

15. The computer program product of claim 10, wherein the process further comprises:

receiving a sampled data stream; and digitally down-converting the sampled data stream to a base band to produce the set of N digital signals.

16. A radio frequency (RF) receiver system comprising:

a plurality of digital phase shifters configured to produce a plurality of reference signals and a plurality of phase-encoded signals, wherein each digital phase shifter is configured to receive a respective digital input signal, to apply a phase offset to the respective digital input signal to produce a respective reference signal, and to apply a unique phase shift to the respective digital input signal to produce a respective phase-encoded signal; wherein the phase offset is common to all respective reference signals, and wherein the unique phase shift applied by each digital phase shifter to the respective phase-encoded signals is selected according to a phase encoding scheme;

a first summer configured to combine the plurality of reference signals to produce a summed reference signal;

a second summer configured to combine the plurality of phase-encoded signals to produce a summed phase-encoded signal;

a channelizer sub-system configured to divide the summed reference signal and the summed phase-encoded signal into a plurality of frequency bins; and a detector configured to detect, in a particular frequency bin from among the plurality of frequency bins, a pulse representing an RF signal represented in one of the digital input signals and to perform delta phase measurements between the summed reference signal and the summed phase-encoded signal in the particular frequency bin to estimate a frequency of the RF signal.

17. The RF receiver system of claim 16, wherein each respective digital input signal comprises frequency content representing a portion of an RF bandwidth; and wherein the detector is configured to estimate the frequency of the RF signal by determining, based on the delta phase measurements, the portion of the RF bandwidth corresponding to the digital input signal in which the RF signal is represented.

18. The RF receiver system of claim 16, comprising:

a plurality of digital down-converters, each configured to receive a respective portion of a digital data stream and to down-convert the respective portion of the digital data stream to base-band to produce the respective digital input signal.

19. The RF receiver system of claim 18, comprising:

at least one analog-to-digital converter configured to sample a wide-band RF input signal to produce the digital data stream.

20. The RF receiver system of claim 16, wherein the digital input signals comprise I/Q signal data, and wherein the detector is configured to transform the summed reference signal and the summed phase-encoded signal from I/Q format into amplitude and phase data.

* * * * *